United States Patent Office 3,438,780
Patented Apr. 15, 1969

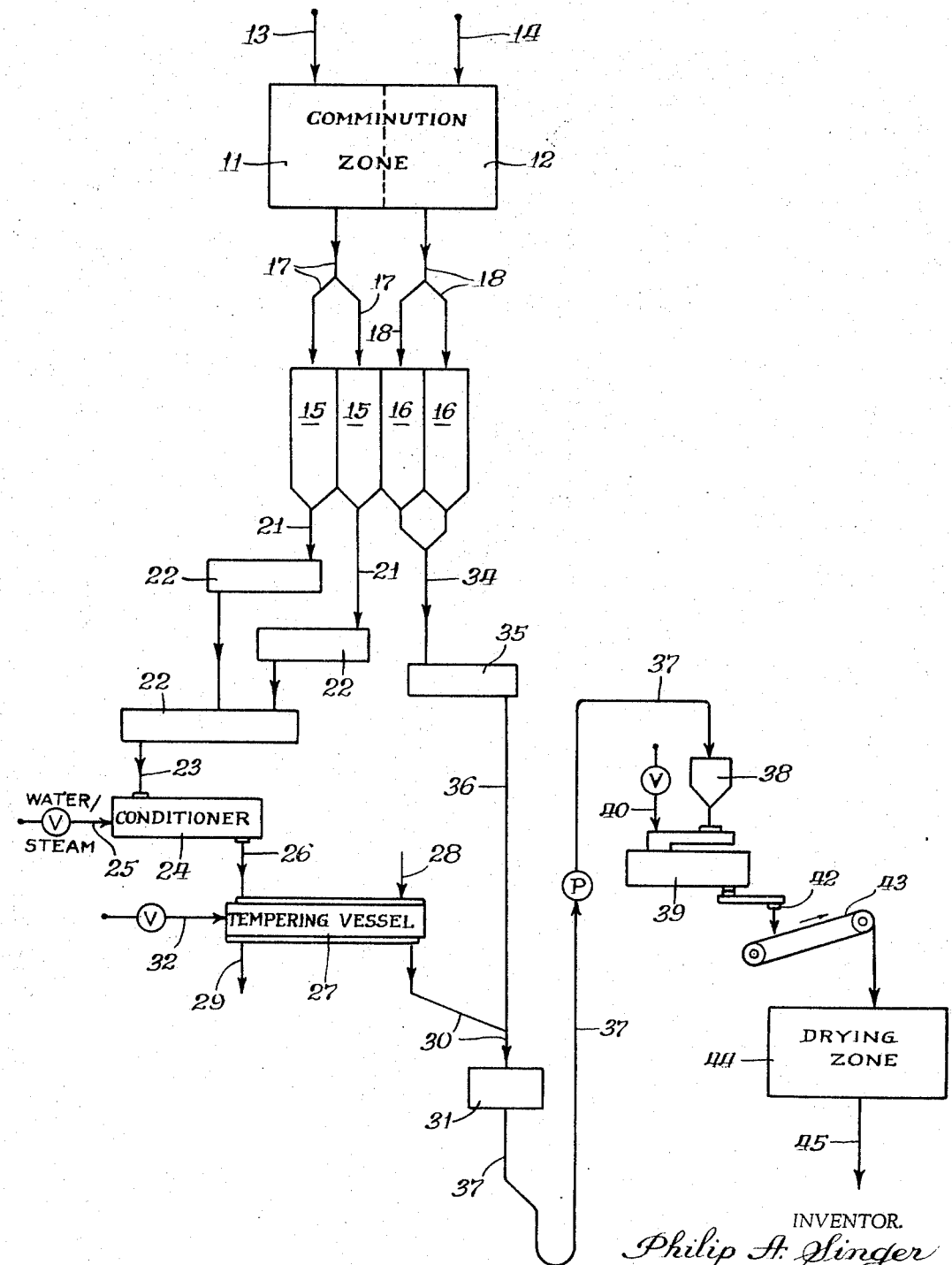

3,438,780
PROCESS FOR MAKING ANIMAL FEEDS
Philip A. Singer, Peoria, Ill., assignor to Allied Mills, Inc., a corporation of Indiana
Filed Nov. 8, 1963, Ser. No. 322,362
Int. Cl. A23k 1/10
U.S. Cl. 99—2
8 Claims

ABSTRACT OF THE DISCLOSURE

Animal feeds containing a starch component 1 and a nonstarch component 2 are produced by separately comminuting 1 and 2, conditioning and tempering 1 in the presence of water to a moisture content of 15 to 30% and at 160 to 200° F. until all starch cells are thoroughly permeated with water, mixing 2 with 1, replenishing the mixture with water to the 15 to 30% moisture content level, heating to 240 to 300° F. under generated steam pressure of 1 to 50 p.s.i.g., and rupturing all starch cells by extruding to atmospheric conditions in the form of the animal food.

---

This invention relates to the preparation of animal feeds and more particularly to the preparation of such animal feeds which have a starch-bearing portion or component.

Animal foods often include a starch-bearing portion which is desirably treated separately from the remainder of the food, the remainder of the food being termed the "nonstarch" portion herein. Treatment of raw starch-bearing material for use in the food is important to disrupt the starch cell so that the food value of the starch-bearing material may be more completely utilized in its consumption. In the feeding of animals, much of the total value of ingested food, and especially starch-bearing ingested food is lost, such loss having been estimated as being on the order of twelve to fifteen percent of the food value. Adding to such loss is the feeding habit of many animals which frequently result in the animal gorging itself without proper mastication of the food. Feeds are consequently only partially digested as evidenced by the feeding of some animals on the foods left in the droppings of other animals.

It has long been proposed to treat starch-bearing materials in the preparation of feeds. For example, Schenck in U.S. Patent No. 45,180 proposed the use of steam or water treatment to obtain an adhesive mass which is thereafter evaporated to dryness in preparation of a concentrated food. Such processing was apparently carried a little further by Bohrmann in U.S. Patent No. 1,057,215 where starch was steamed for bursting of globules and thereafter dried as a poultry feed. Albert in U.S. Patent No. 2,774,670 has more recently proposed the production of a noncellular blend of grain and oil seed in specific proportions, heated and pressed at extremely high pressures. In U.S. Patent No. 2,904,435 Kruse employed steam pressure in forming flakes from soya bean hulls. Templeton in U.S. Patent No. 2,971,843 has prepared a food product dried from a porridge where the porridge was formed by a procedure involving the predigestion step conducted under low temperature and very high water conditions.

In order to obtain a food product wherein the starch cells are sufficiently gelatinized or disrupted to yield increased food value usable by the animals to be fed, one method of treatment has involved the reduction of corn and wheat kernels to a small cube size, cooking the cubes under pressure with the addition of water to attain a very high moisture content until the cereal is completely gelatinized or disrupted and drying the resulting soggy wet mass to a moisture content close to that of the original corn and wheat, e.g., 10%. In order to effect a uniform dispersion of the moisture contained in the resulting grits, the grits are tempered in a bin for an extended period of time. Such grits may be flaked and toasted or pelleted to provide the form desired. Such processing requires a rather long period of time and uses substantial amounts of steam for attaining the moisture content, power for drying in rotary cylinders with large volumes of ambient air and labor for control of the process and transfer of ingredients from stage to stage. Expensive and large volume equipment is also required.

At present, conventional methods now in practice involve a short pressure cooking period of the entire food formula, including starch-bearing material and nonstarch portion or component, followed by extrusion and explosion of starch cells to free the food materials within the cells. However, such methods result in rupture of only a part of the starch cells, e.g., fifty to about ninety percent, and the percentage of rupture for a given formula varies from time to time, providing different food value from batch to batch so that the food value is not standardized between batches. However, because the method does not involve as much expense in labor, steam and power per unit of product, the method is used and the loss in food value is suffered.

It is a general object of this invention to provide a new and useful economical method for obtaining complete rupture of starch cells in the treatment of starch-bearing materials.

It is further the object of this invention to provide such a new and useful method wherein the starch-bearing material is preconditioned and tempered for improved or more complete rupturing of the starch cells on a more consistent basis.

It is also the object of this invention to provide a method wherein starch cells are preconditioned and tempered and thereafter ruptured in a very short processing time which minimizes the possibility of spoilage.

Another object is to provide a new and useful method in accordance with any of the foregoing objects wherein the method may be carried out on a continuous basis.

Still another object of this invention is to provide an improved product including a starch-bearing material having all of the starch cells ruptured for optimum food value.

Other objects of this invention will be apparent from the following descriptions and the drawing in which the figure is a flow diagram illustrating process equipment and steps in an illustrative embodiment of the present process for forming the improved product.

While this invention is susceptible of embodiment in many different forms, there is shown in the drawing and will be described in detail a particular embodiment with the understanding that such embodiment is merely illustrative of the principles of the present invention and is not intended as a limitation on the invention.

In general, in accordance with the present invention, a food product is produced by rupturing all of the starch cells of the predominant starch components, so that the total food value of the material within the cells is provided for utilization during consumption of the food product. The process involves the preconditioning and tempering of the starch-bearing material to uniformly permeate all starch cells with water at a low total water content followed by flashing or sudden vaporization of the water within the starch cells for rupturing the starch cells by explosion. The flashing or sudden vaporization of the water within the cells is produced by subjecting the water-permeated cells to a higher pressure condition, at a temperature which would be sufficient to vaporize the water under a lower pressure condition, and thereafter subjecting the pressurized material to the lower pressure condition so that the water flashes or vaporizes, resulting in explosion of the starch cells.

In the most advantageous form of the invention, the moisture content of the starch-bearing material is maintained in the range of fifteen to thirty percent throughout the pretreatment, tempering and vaporization explosion procedures.

Turning now to the figure of the drawing, there is illustrated a system for carrying out the present method. As an example of the general operation of the illustrated system, and referring to the figure, it is desired to prepare an animal food product containing a starch-bearing material and a nonstarch component. Accordingly, raw starch-bearing material and nonstarch material are fed to separate comminution zones 11 and 12 via lines 13 and 14, respectively. Feeding of the components is continuous. In zones 11 and 12, the feed components are subjected to grinding or comminution to such a degree that the resulting whole product from the system will pass a very fine screen, e.g., sixty to eighty meshes per inch. The comminution step permits less reliance upon the effectiveness of the mastication of food by the animal, this step reducing the particle size of the feed components to prepare the feed product for action by the gastric juices in the digestive tracts of animals. Such comminution is often used as a step in the preparation of animal food products, and the comminution equipment, residence time, and other conditions will be apparent to those in the art. The resulting comminuted starch-bearing material and nonstarch material are discharged respectively to collection zones 15 and 16 by continuous flow through lines 17 and 18, respectively. Collection zones 15 and 16 collect the comminuted materials for continuous feeding to the subsequent process steps.

The collected material in zone 15 is fed through lines 21 and a feeder system 22 and line 23 to a conditioning zone 24. The material proceeds through conditioning zone 24 and water and/or steam is added to the conditioning zone to valve line 25 in an amount sufficient to maintain a moisture content, preferably in the range of fifteen to thirty percent, in the conditioning material. The temperature in zone 24 is maintained at an elevated level below the boiling point of water, e.g., in the range of 160 to 200° F., and the material is passed through the conditioning zone 24 by a screw drive, pump, or the like (not shown), at a rate to provide a short residence time, e.g., one to five minutes in the conditioning zone. The material is discharged from zone 24 through line 26 to a cooking or tempering zone 27.

The temperature in conditioner 24 is established and maintained by the temperature of the steam or water added through line 25 and for this purpose live steam may be advantageously used.

Tempering zone 27 provides a longer holding time for the conditioned material in the presence of the water added in the conditioning zone and at an elevated temperature, e.g., 160 to 200° F. The material is charged through tempering zone 27 at a rate sufficient to permit the water to thoroughly penetrate and swell all starch cells in the starch-bearing material. The penetration is generally uniform from cell to cell. A residence time in the range of ten to sixty minutes is believed to be adequate for this purpose. The temperature of zone 27 is maintained by circulation of hot water or steam from line 28 through a heat exchange jacket on the vessel defining zone 27, the water being drained from the jacket by a line 29.

The tempered material is discharged from zone 27 through line 30 to a mixer 31.

If desired, enzymes may be added through line 32 to zone 27 for purpose of conversion or predigestion of the material therein. In such case, the temperature in zone 27 should be maintained at a level at which the enzyme functions satisfactorily.

In the meantime, nonstarch material which has been comminuted and collected in zone 16 is discharged from zone 16 through line 34 and fed by feeder system 35 through line 36 to mixer 31. Mixer 31 is a conventional mixer device and mixes the tempered starch-bearing material with the comminuted nonstarch component and discharges the resulting mixture through line 37 to a collection hopper 38. A pump or other conveyor may be used in line 37 to raise the mixture to hopper 38.

The mixture is fed from collection hopper 38 to an extruder 39 and is extruded from the extruder head 42 to a belt conveyor 43. Extruder 39 is of the type including a heated pressurized chamber and the pressure and temperature in the pressurized chamber are maintained sufficiently high, e.g., 1 to 50 p.s.i.g. and 240 to 300° F., to permit heating of the water within the cells to cause their eruption by flashing of the water upon extruding the material to atmospheric pressure.

Steam or water, and preferably steam, is added to the pressurized chamber of extruder 39 in an amount to bring the moisture content up to the desired level, e.g., 15 to 30% in view of the ration of lower water content which has been added to and mixed with the tempered starch-bearing material. Alternatively, the water may be added at mixer 31 or elsewhere upstream from the extruder chamber. A residence time of 1 to 5 minutes is usually adequate to bring the water within the cells to the explosion temperature for explosion upon extrusion to a lower pressure, e.g., atmospheric. The pressure within the extruder chamber is sufficient to suppress flashing or sudden vaporization of the water while the material is still within the extruder chamber and to suppress the explosion of the starch cells or substantial leakage of water therefrom. The extruder extrudes the material in a desired form on belt 43 with commensurate explosion of the starch cells. The form or configuration of the extruded material is controlled by the extruder die which may be selected in accordance with the desired extruded configuration.

The extruded material is discharged from the end of conveyor 43, e.g., using a doctor's plate, or the like, if necessary, into a drying zone illustrated at 44 for drying of the material for circulation of ambient temperature air or by other drying techniques used in the art. The dried material is recovered from line 45 as a food product. The product from line 45 may subsequently be cooled, sized and packaged, as desired.

In further illustration of the method of this invention, the following examples are given:

EXAMPLE 1

This example illustrates the preparation of a cattle or dairy feed. The ingredients for the cattle or dairy feed are as follows:

| | Pounds |
|---|---|
| Ground corn | 47.00 |
| Ground milo | 10.00 |
| Hominy feed | 10.00 |
| Wheat middlings | 10.00 |
| Corn gluten meal | 10.00 |
| Dehydrated alfalfa | 1.00 |
| Soy bean meal | 5.20 |
| Cottonseed meal | 3.00 |
| Urea | 1.00 |
| Dicalcium phosphate | 1.00 |
| Limestone | .25 |
| Fats | 1.00 |
| Mineral and vitamin premix | .55 |
| | 100.00 |

The ground corn, ground milo, hominy feed and wheat middlings are introduced into the system of the figure through line 13 as the starch-bearing portion of the formulation. The remainder of the ingredients, i.e., generally nonstarch, are introduced through line 14. The introduction of the ingredients through each line is generally continuous in the proportions indicated in the above formulation. Thus, 77 pounds of the starch-bearing material are introduced per 23 pounds of the remaining ingredients or nonstarch component. The starch-bearing materials normally contain about 10% of water. In zone 24, an additional 12 pounds of water is added as live steam per 77 pounds of starch-bearing material to bring the starch bearing material to a moisture content of about 22%. At the time of water addition, sufficient heat is applied by an external heating source (not shown) to the conditioning zone 24 to bring the temperature of the mixture therein to about 180° F., the live steam assisting in raising and maintaining the temperature. The residence time in zone 24 is about 1 minute. The mixture flows from zone 24 to zone 27 which is also maintained at 180° F. The residence time in zone 27 is about 20 minutes and the resulting material, including swollen, water-permeated starch cells, after flowing through zone 27 in the 20 minute residence time, is mixed with the ration in mixer 31 and is then charged to the heated pressurized chamber of extruder 39. Sufficient live steam is added to line 40 to bring the mixture to the 22% water level and heat is applied to the zone by heating means (not shown) in the extruder structure to attain a temperature of about 250° F. The additional water, e.g., 3.6 pounds per 112 pounds of total mixture, from line 40 is required for the nonstarch portion of the formula which entered the system at an approximate 10% water level. The pressure zone is maintained at a pressure of about 15 p.s.i.g. and the residence time of the material in the zone is about 2 minutes, whereafter the material is extruded to atmospheric pressure, dried at 44 and recovered at 45. The resulting material includes all of its starch cells in ruptured or exploded condition, releasing the food value therefrom.

EXAMPLE 2

This example illustrates the production of a poultry food product. A typical formulation of a poultry food is as follows:

| | Pounds |
|---|---|
| Corn | 28.00 |
| Milo | 20.00 |
| Hominy | 17.50 |
| Dehulled soy bean meal | 5.00 |
| Soy bean meal | 14.80 |
| Corn gluten meal (60% protein) | 2.00 |
| Corn gluten meal (41% protein) | 1.00 |
| Poultry meat meal | 1.00 |
| Dehydrated alfalfa | 1.00 |
| Animal and vegetable oil | 3.00 |
| Fish meal | 2.00 |
| Vitamin, mineral and amino acid premix | 2.00 |
| Salt | .20 |
| Limestone | 1.00 |
| Dicalcium phosphate | 1.50 |
| | 100.00 |

Of the above total, 65.5 pounds, i.e., the corn milo and hominy, are the starch bearing materials. The starch-bearing materials and remainder of the formulation were processed under the same conditions as in Example 1 at a 22% moisture content level, requiring addition of 10 pounds of water or steam per 65.5 pounds of starch-bearing material to zone 24 through line 25 and a little more than 5 pounds of water per 110 pounds of mixture in extruder 39 via line 40.

EXAMPLE 3

This example illustrates the production of a typical dog food. The typical dog food formula is as follows:

| | Pounds |
|---|---|
| Fish meal | 3.00 |
| Dried skim milk | 2.50 |
| Wheat bran | 4.00 |
| Vitamin and mineral mix | .20 |
| Salt | .25 |
| Meat or beef scraps | 15.00 |
| Soy bean meal or grits | 20.00 |
| Wheat germ meal | 6.50 |
| Cereal grains | 48.55 |
| | 100.00 |

Of this total, approximately 48½ pounds of cereal grains constitute the starch-bearing material which is processed under the same conditions as Examples 1 and 2 through the system of the figure, except that 7½ pounds of water are added at zone 24 to maintain the 22% moisture content level, and, of course, subsequent addition of slightly more than 7½ pounds of water at the pressurized chamber in extruder 39 via line 40. The resulting dog food is a highly acceptable product.

Examples of other foodstuffs for cattle, horses, swine, laboratory animals, poultry, dogs, cats, and other pets, from a large variety of formulations will be apparent to those in the art. The starch-bearing materials in such formulations may be any of those normally used in animal foodstuffs, e.g., cereal grains, corn, milo, hominy, wheat middlings, etc. Although the materials are starch-bearing materials, their cells are unlike the cells of pure starch in that the cells of pure starch are more easily ruptured. Pure starch, when treated with added moisture and elevated temperature, begins to swell at a temperature ranging from 120 to 140° F. The starch cells present in cereals and other starch-bearing feed materials are protected by a film composed of amylopectin and proteolitic products, and, when treated with added moisture, do not begin to swell until an elevated temperature, e.g., above 160° F., such as 170 to 180° F., is obtained. The starch cells may vary in size dependng on the origin of the cell. Corn starch cells are relatively small while potato starch cells are much larger. The micron size of starch cells ranges from 3 or 4 to as high as 100 and may accordingly require a variation in treating temperature depending upon the starch source used, the smallest starch cells requiring additional treating time to assure their complete and uniform permeation with water. We have found that a temperature of about 180°, a moisture content of about 22% and a tempering time of about 20 minutes are ideal conditions for the treatment of the starches contained in the cereals more commonly employed in the compounding of foodstuffs.

The nonstarch bearing materials may include a variety of ingredients added as needed or desired by the formulator and including such materials as brans, roughage, minerals, high protein meats, fats, oils, vitamins, enzymes and any other food components which may be needed or desired to provide a balanced animal food; such ingredients may be selected by and will be apparent to those in the art.

It is an advantage of the present invention that all of the starch cells in the starch bearing component treated are ruptured, thereby freeing more food value for utilization by the animal. Further, the low water level maintained during the processing from the initial treatment of the starch bearing component through the extrusion of the food product greatly reduces the evaporation requirement in obtaining a dry or low moisture content product since it is only necessary to evaporate one-half as much water to provide a dried product in comparison with other preparation methods. For low moisture content products, e.g., on the order of about 10% moisture, even less evaporation is needed comparatively. Additionally, the shorter processing time which may be used in the present method decreases the chances for spoiling during processing. The process may be operated on a continuous basis using less steam, e.g., as introduced through lines 25 and 40, less heating power and less labor than is often required in the preparation of starch bearing animal foodstuffs. Besides the resulting reduction in cost, the present method produces an improved food product. A product prepared as in Example 3 has been subjected to dog feeding tests with excellent reception by the dogs.

All percentages given herein are percentages by weight unless otherwise indicated.

I claim:

1. A method of preparing starch-bearing animal feed material for ingestion which method comprises heating raw starch-bearing animal feed material in the presence of sufficient water to provide a moisture content in said material in the range of 15 to 30% at a temperture in the range of about 160 to 200° F. for a period of one to five minutes, holding said heated material in the presence of said water at a temperature in the range of 160 to 200° F. for a period of from about 10 to 60 minutes sufficient to effect uniform permeating of water into each starch cell of said starch-bearing material, heating the resulting heated material at a steam pressure in the range of 10 to 50 p.s.i.g. at a temperature of 240 to 300° F. for a period of 1 to 5 minutes sufficient to bring the temperature of the water in the starch cells well above vaporization temperature under ambient atmospheric conditions in the absence of material physical rupture of the starch cells, thereafter releasing the heated pressurized starch cells to ambient atmospheric conditions whereby substantially all of the starch cells are ruptured and recovering the product including the ruptured starch cells as an ingestible starch-bearing material.

2. A continuous method of preparing starch-bearing animal feed material for ingestion which method comprises directing a stream of raw starch-bearing animal feed material through a comminution zone for comminuting the raw starch-bearing material to a reduced particle size, adding sufficient water to the comminuted material to bring the moisture content into the range of 15 to 30% and maintain the moisture content in said range, directing the comminuted material in the presence of the added water through a holding zone at an elevated temperature below the boiling point of the water for a period of time sufficient to enable the water to thoroughly permeate and swell all starch cells of the mixture and gelatinize the starch, directing the stream from said holding zone through a pressurizing zone maintained at a pressure in the range of 10 to 50 p.s.i.g. and at a temperature of 240 to 300° F. for a residence time sufficient to bring the temperature of the water in the starch cells well above the vaporization temperature of the water under atmospheric conditions, and extruding the mass from the pressurized zone to atmospheric conditions whereby the starch cells are disrupted.

3. A method of preparing an animal food of a formula including a starch-bearing portion which method comprises heating the starch-bearing portion in the presence of sufficient water to bring the moisture content thereof within the range of 15 to 30% at an elevated temperature below the water boiling point for a time sufficient to enable the water to thoroughly permeate and swell all of the starch cells, mixing the resulting tempered material with the remainder of the ingredients of the animal food formula, adding sufficient water to the mixture to bring the total mixture moisture content within the range of 15 to 30%, heating the resulting mixture at an elevated temperature at 10 to 50 p.s.i.g. steam pressure sufficient to bring the water temperature in the starch cells well above vaporization temperature under atmospheric conditions but below substantial vaporization temperature at said 10 to 50 p.s.i.g. steam pressure, and flashing the water within said cells to atmospheric conditions whereby the starch cells are exploded by vaporization of water therein.

4. A continuous process for preparing an animal food including a starch-bearing portion and a nonstarch portion, which method comprises continuously charging the starch-bearing portion through a conditioning zone at a temperature in the range of about 160 to 200° F. at a rate sufficient to provide a residence time of about 1 to 5 minutes while adding sufficient water to said zone to provide a moisture content of 15 to 30% in the starch-bearing material, continuously charging the resulting conditioned material from a conditioning zone through a tempering zone at a rate sufficient to provide a residence time in said tempering zone in the range of 10 to 60 minutes, maintaining said tempering zone at a temperature in the range of 160 to 200° F., continuously charging the resulting tempered material from said tempering zone to a mixing zone, continuously charging said nonstarch portion to said mixing zone in an amount relative to said starch-bearing portion to provide the desired ratio therebetween, and mixing said tempered material and ration in said mixing zone, supplying water to said mixture in an amount sufficient to bring the moisture content of the mixture within the range of 15 to 30%, continuously charging the mixture to a pressurized extruding zone at a pressure of 10 to 50 p.s.i.g. and a temperature of 240 to 300° F. at a rate sufficient to provide a residence time of 1 to 5 minutes in said extruding zone, continuously extruding the resulting pressurized material from the extruding zone to the desired configuration and drying the resulting extruded material as dried animal food product.

5. The method of preparing raw starch-bearing animal feed material for ingestion, which method comprises mixing the starch-bearing material with nonstarch feed components, heating the mixture at a sufficient temperature not in excess of 300° F. and at a steam pressure not exceeding 50 p.s.i.g. for a sufficient time in the presence of a sufficient amount of water and in the absence of added acid to thoroughly permeate all starch cells of said starch-bearing material with water in the absence of substantial modification of the starch and in the absence of physical rupture of the starch cells, thereafter rupturing substantially all of the starch cells in said starch-bearing material by releasing the starch-bearing material suddenly to atmospheric pressure, and recovering the resulting feed product.

6. The method of preparing starch-bearing animal feed material for ingestion, which method comprises permeating the cells of the starch-bearing material with water and mixing the starch-bearing material with nonstarch feed components, heating the mixture at a sufficient temperature above atmospheric vaporization temperature of water not in excess of 300° F. and at a steam pressure not exceeding 50 p.s.i.g. for a sufficient time in the presence of a sufficient amount of added water and in the absence of added acid to maintain the starch cells permeated with water in the absence of substantial modification of the starch and in the absence of physical rupture of the starch cells, thereafter rupturing substantially all of the starch cells in said starch-bearing material by releasing the starch-bearing material suddenly to atmospheric pressure, thereby gelatinizing the starch, and recovering the resulting feed product.

7. The method of preparing starch-bearing animal feed material for ingestion, which method comprises heating the starch-bearing material with water until the starch cells are permeated with water, mixing the resulting water-permeated starch material with nonstarch animal feed material, heating the resulting mixture in the presence of sufficient moisture to maintain the starch cells permeated at a temperature above the atmospheric vaporization temperature of water and not in excess of 300° F. under sufficient pressure at a steam pressure not exceeding 50 p.s.i.g steam pressure to prevent vaporization of the water, thereafter rupturing substantially all of the starch cells in said starch-bearing material by extruding and thereby releasing the mixture to atmospheric pressure, and recovering the resulting feed product.

8. The method of preparing starch-bearing animal feed material for ingestion, which method comprises heating the starch-bearing material with water in an extruder until the cells are thoroughly permeated with the water and to a temperature above atmospheric vaporization temperature of water, no greater than 300° F. at a steam pressure sufficient to prevent vaporization of the water but not exceeding 50 p.s.i.g. steam pressure and in the absence of substantial rupturing of the starch cells, thereafter rupturing and gelatinizing substantially all of the starch cells in said starch-bearing material by releasing the starch-bearing material from the extruder suddenly to atmospheric pressure and recovering the resulting feed product.

References Cited

UNITED STATES PATENTS

| 2,120,138 | 6/1938 | Mathews et al. | 99—2 |
|---|---|---|---|
| 2,653,097 | 9/1953 | Baer | 99—82 |
| 2,836,495 | 5/1958 | Thompson et al. | 99—83 X |
| 3,108,530 | 10/1963 | Zies | 99—81 X |
| 3,117,006 | 1/1964 | Wenger | 99—82 X |
| 3,119,691 | 1/1964 | Ludington et al. | 99—2 |
| 3,139,342 | 6/1964 | Linskey | 99—2 |
| 3,251,702 | 5/1966 | Stickley et al. | 99—82 X |

RAYMOND N. JONES, *Primary Examiner.*

J. M. HUNTER, *Assistant Examiner.*

U.S. Cl. X.R.

99—4, 7